United States Patent [19]
Groleau

[11] Patent Number: 5,433,462
[45] Date of Patent: Jul. 18, 1995

[54] COLLAPSIBLE WHEELBARROW

[76] Inventor: Rodney J. Groleau, 1753 Apache Pass, Traverse City, Mich. 49684

[21] Appl. No.: 198,519

[22] Filed: Feb. 18, 1994

[51] Int. Cl.6 .................................................. B62B 1/20
[52] U.S. Cl. ..................................... 280/38; 280/659; 280/47.31; 298/3
[58] Field of Search ............... 280/47.31, 47.3, 47.131, 280/47.17, 47.2, 47.21, 78, 38, 645, 659, 47.12, 47.315; 298/2, 3

[56] References Cited

U.S. PATENT DOCUMENTS

| | | | |
|---|---|---|---|
| 2,484,677 | 10/1949 | Binz | 280/38 |
| 2,494,199 | 1/1950 | Provitola | 280/47.31 |
| 2,789,829 | 4/1957 | Parker | 280/47.315 |
| 2,967,058 | 1/1961 | Hoffman | 280/47.31 |
| 3,106,303 | 10/1963 | Finocchiaro | 298/2 |
| 3,565,453 | 2/1971 | Del Raso | 280/38 |
| 4,471,996 | 9/1984 | Primeau | 280/47.31 |
| 5,222,757 | 6/1993 | Magyar | 280/47.3 |

FOREIGN PATENT DOCUMENTS 2539690 7/1984 France ......................... 280/659

Primary Examiner—Anne Marie Boehler
Attorney, Agent, or Firm—James M. Deimen

[57] ABSTRACT

A collapsible flexible wheelbarrow comprises a wishbone shaped frame that supports a heavy weight cloth hopper. Attached to the nose of the wishbone frame is a wheel that is rotated and affixed out of the plane of the frame for use and into the plane of the frame for storage. Thus, with the cloth hopper the entire wheelbarrow can be collapsed substantially flat. A relatively rigid lip extends across the top edge of the hopper substantially between and adjacent the ends of the wishbone frame. The ends of the frame are formed with handgrips. With the handgrips resting on the ground, the lip also lies on the ground permitting debris to be easily swept into the hopper.

13 Claims, 1 Drawing Sheet

COLLAPSIBLE WHEELBARROW

BACKGROUND OF THE INVENTION

The field of the invention pertains to wheelbarrows for manually carrying a wide variety of light bulky or heavy items. In particular, the invention pertains to wheelbarrows that can be easily loaded and unloaded, and to wheelbarrows that can be folded substantially flat for hanging storage on a wall.

The typical wheelbarrow comprises a pair of arms attached together to form a "V". A single wheel and wheel attachment means depend from the apex of the "V" and handgrips are formed on the tips of the "V". Within the "V" a cargo hopper of metal or plastic is attached to the arms. Attached to the arms adjacent the handles are a pair of legs to support the hopper above the ground when the wheelbarrow is not being moved.

The typical wheelbarrow serves very well for carrying cargo, however, the cargo must be lifted to load the hopper. Unloading requires either lifting the cargo from the hopper or tilting the entire hopper and arms over the wheel. In addition, the typical wheelbarrow is a bulky item to store and transport.

Many light items such as leaves and yard debris are best swept, raked or blown and therefore not conveniently loadable into a typical wheelbarrow. Likewise, some heavy items such as rocks and small boulders are best slid or rolled and therefore also not conveniently loadable into a typical wheelbarrow.

SUMMARY OF THE INVENTION

The invention comprises a collapsible flexible wheelbarrow wherein the cargo hopper is of heavy tarpaulin cloth and the wheel can be folded substantially into the plane of the arms and handles. Thus, in collapsed form the wheelbarrow is substantially flat. In uncollapsed form the wheelbarrow handles or handgrips can be lowered to the ground. When placed on the ground a portion of the top edge of the hopper is flat to the ground allowing leaves and yard debris to be easily swept into the hopper. Mulch and other light bulky material can be easily swept into or out of the hopper. Heavy items such as rocks can be merely rolled into or out of the hopper.

The wheel is preferably relatively large such as a small bicycle wheel. The wheel is mounted in a bicycle like fork and the cylindrical top or stem of the fork is clamped to the apex or nose of a pair of arms forming a "V". The clamp allows the wheel and fork to be pivoted and turned about two substantially perpendicular axes to collapse the wheelbarrow. Thus, the wheelbarrow may be easily hung flat on a wall.

With the use of arcuate tubes for the arms, the hopper is shaped like a small dinghy type boat of collapsible heavy cloth. The "transom" of the hopper lies on the ground when the handgrips are placed on the ground. A lip attached to the upper edge of the hopper between and adjacent the handles straightens and holds the edge of the hopper to the ground. The flexible tube arms allow the arms to be flexed inward a few inches to pass through a narrow gate or between trees.

DESCRIPTION OF THE PREFERRED EMBODIMENTS

Figure 1:
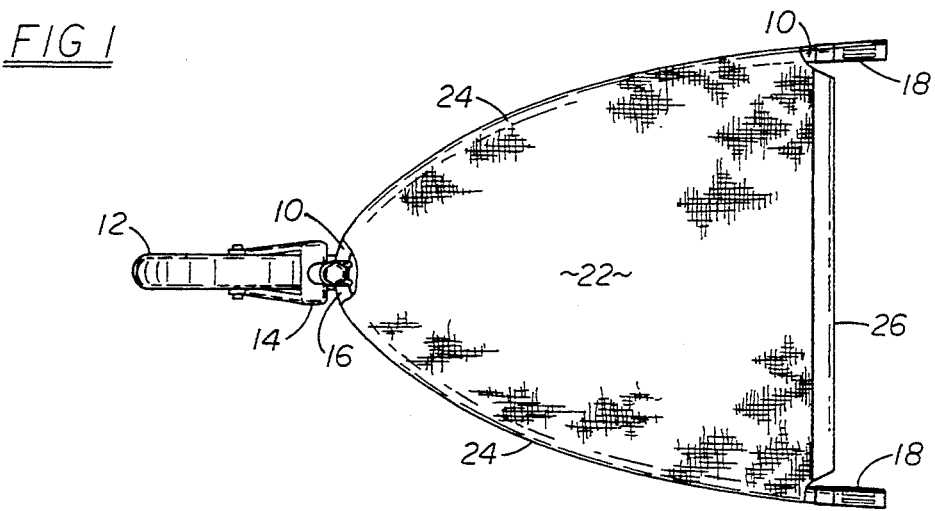
FIG. 1 is a top view the new wheelbarrow.
Figure 2:
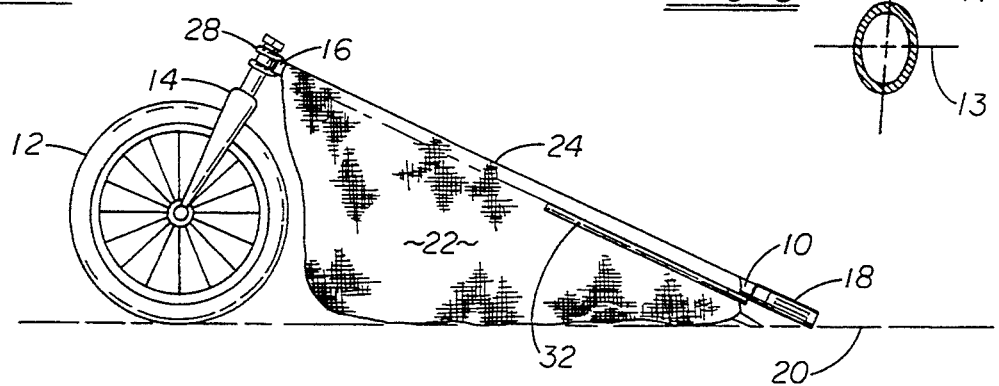
FIG. 2 is a side view of the new wheelbarrow.

Illustrated in FIGS. 1 and 2 is the new wheelbarrow having a wishbone shaped double handle frame 10 and a single wheel 12. The wheel 12 is mounted in a fork 14 in turn attached to the frame 10 at the nose 16. The tips 18 are formed with handgrips which rest on the ground 20 as shown for loading the wheelbarrow.

Suspended downwardly from the frame 10 is a cargo carrying bag 22 made of canvas or heavy tarp material. The bottom of the bag 22 is shaped to lie flat on the ground as shown or, optionally, a piece of fiberboard may be placed in the bag to shape the bottom. To attach the bag 22 to the frame 10 tubular pockets 24 may be sewn into the bag and the frame 10 slipped through the pockets. Rings sewn to the bag 22 with the frame 10 slipped therethrough is one of many alternatives for attaching the bag to the frame.

A relatively rigid lip 26 of hard plastic or rubber extends across the opening of the bag 22 between the handgrips 18 to keep the bag on the ground 20 in the manner of a dust pan. Thus, lawn and yard debris can be easily raked or blown into the bag 22. Large heavy materials such as rocks, animal carcasses or large bags of materials can also be rolled into the bag 22 prior to being moved.

Figure 5:
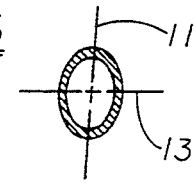
FIG. 5 illustrates in cross-section a tubular arm of elliptical shape.
Figure 3:
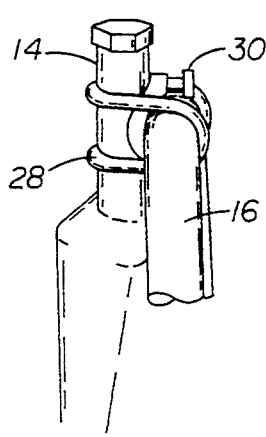
FIG. 3 is a detail of the folding attachment for the wheel.
Figure 4:
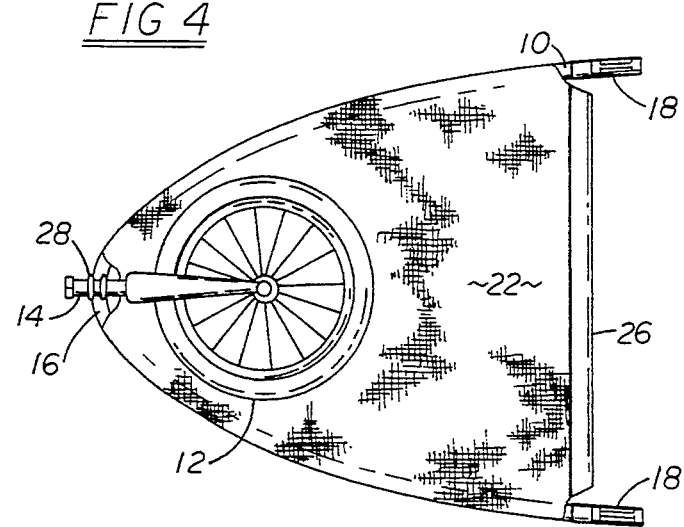
FIG. 4 illustrates the folded wheelbarrow.

The bag 22 is sized at the lip 26 to cause the springing action of the wishbone shaped frame 10 to hold the bag taught. Preferably, the frame 10 is constructed of a pair of cylindrical or elliptical cross-section tubes each bent to an arcuate shape with a tube connector at 16 to form the wishbone shape, or the frame 10 may be a single piece of tube bent to the wishbone shape. With elliptical cross-section frame tubing as shown in FIG. 5, the major axis 11 is vertical and minor axis 13 horizontal thereby providing vertical stiffness relative to horizontal flexibility in the frame 10. The fork 14 also is connected to the connector at 16 and this may be a rigid connection. However, in the preferred connection, the fork connection 28 includes two pivoting degrees of freedom controlled by a large set screw 30 as best shown in FIG. 3. A suitable fork connection 28 comprises the wire rod and saddle cross-grip pipe rack clamp as shown. Thus, the wheel 12 and fork 14 can be pivoted 90° and then rotated relative to the frame about 90° to bring the wheel approximately into the plane of the frame 10 as shown in FIG. 4. The entire wheelbarrow can be folded substantially flat for hanging on a wall.

The spring flexing action of the frame 10 allows the handgrips 18 to be pulled in by the operator, either by using manual force or by using a strap or rope between the grips. This allows the wheelbarrow to be narrowed several inches when going through small areas such as gates or narrow passageways.

The large, single wheel 12 allows the wheelbarrow to easily roll over large obstructions such as steps and uneven terrain. The collapsible bag 22 of tarp or canvas material allows the wheelbarrow to be emptied of bulky light loads by simply tipping the wheelbarrow over, picking it up, and shaking it out. The bag 22 can be made of waterproof material for carrying liquids and slurries such as water, cement mortar or concrete.

As an option, a pair of folding legs 32 may be attached to the underside of the frame 10 with hinges adjacent the handgrips 18. When the legs 32 are folded down to rest on the ground, the handgrips 18 and hopper 22 are raised to the level of a conventional wheelbarrow.

I claim:

1. A collapsible manual cargo carrier comprising a pair of arms joined together to form an apex, a rotatable wheel, a fork attaching the wheel to the apex, the fork attachment to the apex including tightenable means to provide two rotational degrees of freedom between the fork and the arms when the tightenable means are untightened and no degree of freedom when the tightenable means are tightened, a cargo hopper open upwardly and attached to the arms, the arms being spaced apart at arm ends remote from the apex, and the hopper upper opening being formed by side edges and a rear edge, a lip attached to the hopper between the arms and substantially spaced from the arm ends, the lip being attached to the hopper adjacent the rear edge of the hopper opening and the lip being substantially straight along the attachment to the hopper whereby the rear edge of the hopper is retained straight and rests on the ground when the arm ends rest on the ground.

2. The cargo carrier of claim 1 wherein the hopper attachment to the arms is adjacent the side edges of the hopper.

3. The cargo carrier of claim 1 wherein the arms comprise a tubular member bent relatively sharply at the apex and relatively gently bowed between the apex and each handle.

4. The cargo carrier of claim 1 wherein the tightenable means comprises a cylindrical member on the fork, a substantially cylindrical external shape to the apex, and a wire rod cross-grip engaging the cylindrical member to the cylindrical shape, the cross-grip including a saddle between the cylindrical member and the cylindrical shape.

5. The cargo carrier of claim 1 wherein the hopper bottom is shaped to lie substantially flat to the ground.

6. A collapsible manual cargo carrier comprising a pair of arms joined together to form an apex and the arms being spaced apart at arm ends remote from the apex, a flexible hopper attached to the arms and suspended therefrom, the hopper having sides and a bottom shaped to lie substantially flat on the ground when the arm ends rest on the ground, a fork having a stem, the stem being attached to the apex, a wheel rotatably attached to the fork, the wheel and fork supporting the arms and hopper sides above the ground, and a substantially straight and rigid lip attached across the rear of the hopper and substantially spaced from the arm ends, the bottom of the hopper terminating at the rear attachment to the lip and the lip positioned to rest on the ground between the arms when the arm ends rest on the ground.

7. The cargo carrier of claim 6 wherein the stem attachment to the apex includes loosenable means to provide two degrees of rotational freedom for the stem relative to the apex when the means are loosened whereby the fork and wheel may be rotated into the plane of the arms for storage of the carrier.

8. The cargo carrier of claim 7 wherein the loosenable means comprises a wire rod cross-grip and saddle engaging the stem to the apex and threaded means engaging the saddle to tighten and loosen the engagement.

9. The cargo carrier of claim 6 wherein the hopper shape is substantially triangular in plan view and the hopper sides are substantially triangular in elevational view.

10. The cargo carrier of claim 6 including a pair of support legs hinged to the arms adjacent the arm ends to optionally support the arm ends spaced above ground.

11. The cargo carrier of claim 6 wherein the arms comprise cylindrical tubes each arcuately bowed between the apex and the arm end.

12. The cargo carrier of claim 6 wherein the arms comprise elliptical tubes with the major axes of the elliptical cross-section vertical and each tube arcuately bowed between the apex and the arm end.

13. The cargo carrier of claim 1 wherein the arms comprise elliptical tubular members having the major axes of the elliptical cross-section vertical.

* * * * *